United States Patent Office 3,276,625
Patented Oct. 4, 1966

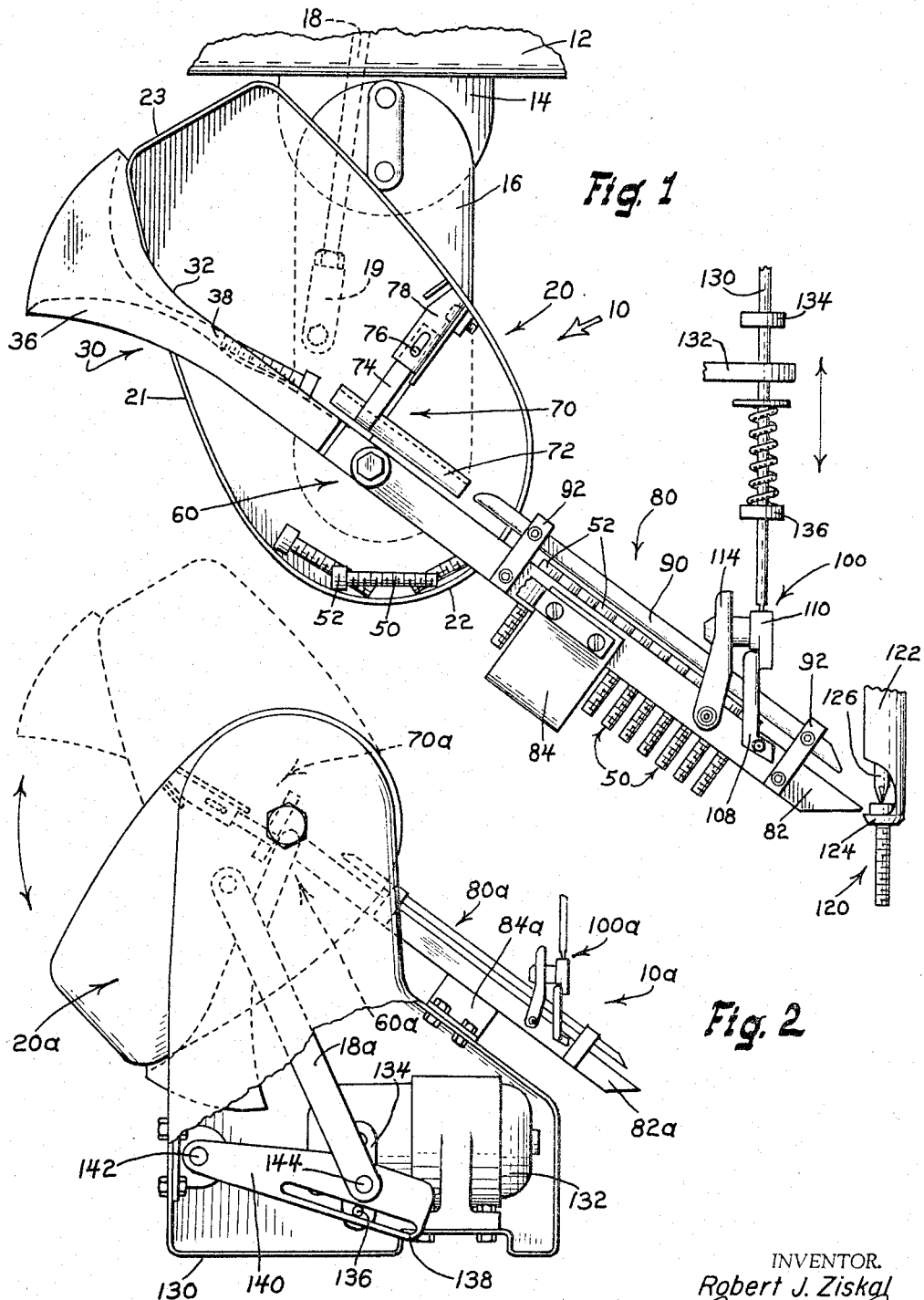

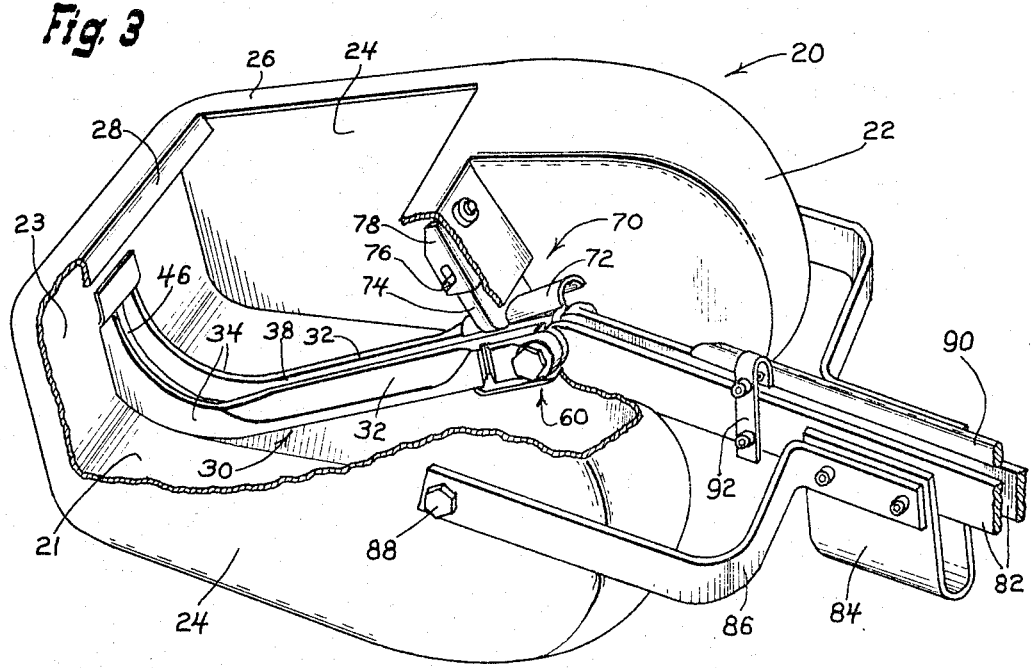
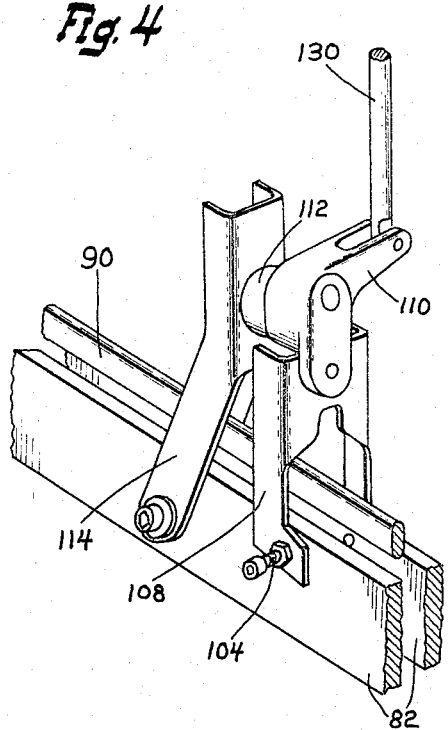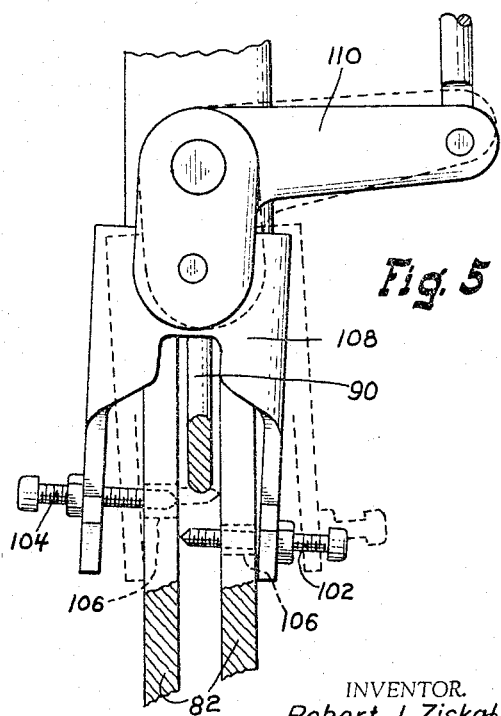

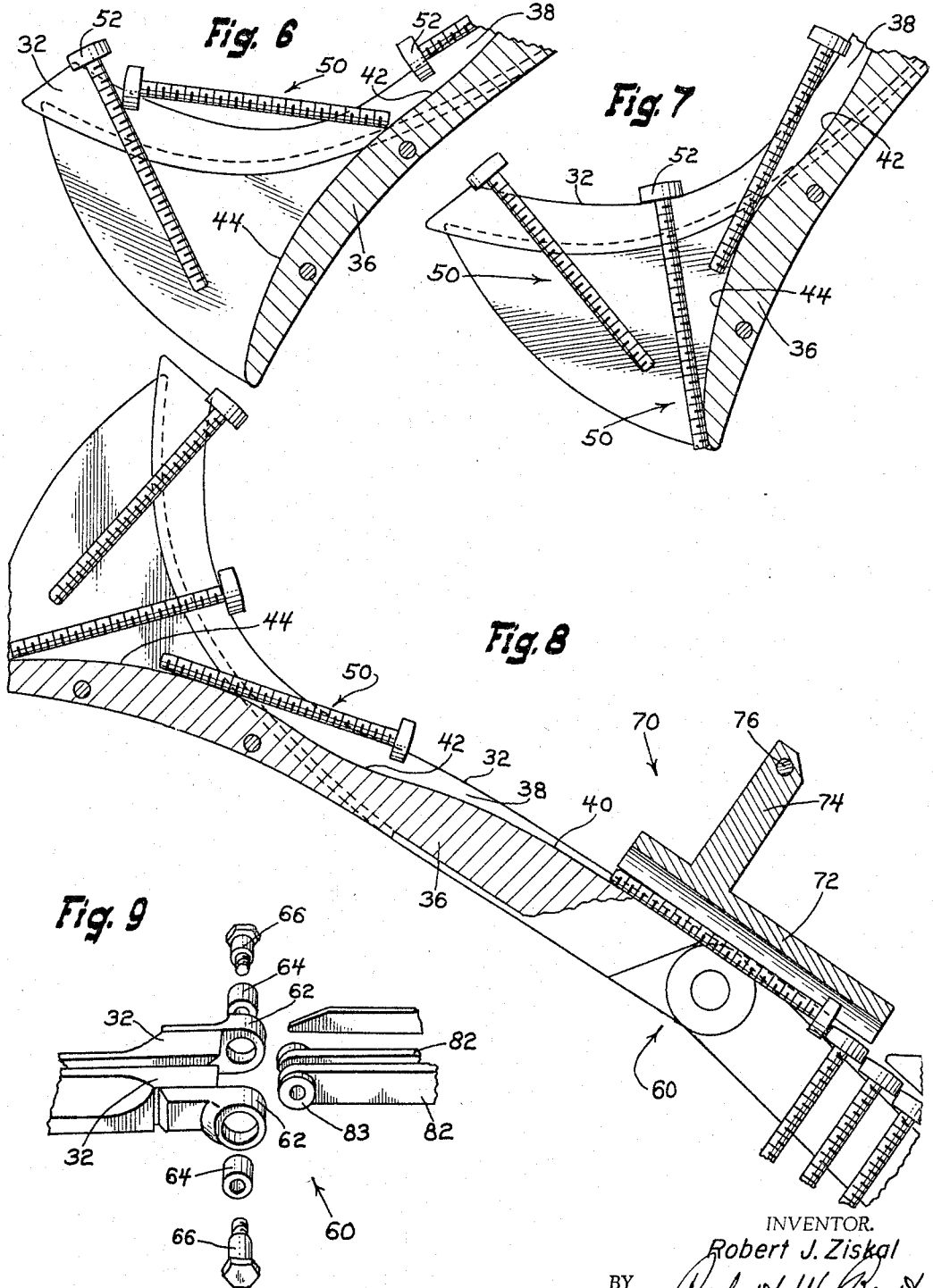

3,276,625
HOPPER MECHANISM FOR ORIENTING HEADED ARTICLES
Robert J. Ziskal, Chicago, Ill., assignor to Illinois Tool Works Inc., Chicago, Ill., a corporation of Delaware
Filed Apr. 30, 1964, Ser. No. 363,850
4 Claims. (Cl. 221—167)

The present invention relates to an article transporting apparatus, and more particularly to an apparatus for arranging a disoriented array of articles and for transporting articles in an unimpeded manner to an article collecting and delivery mechanism for controlled transfer of the articles.

Oscillating hoppers for arranging and transporting articles are known in the art, one type of such device being shown in the patent to A. H. Haberstump, 2,943,764 dated July 5, 1960. These hoppers receive articles such as screws, rivets, nuts and the like in disoriented array, and arrange them in a desired manner for transportation to a storage device which, in most instances, is a delivery chute. The articles can then be transferred from this chute to a power screw driver, riveting device or the like for subsequent operation thereon. A typical example of an oscillating hopper mechanism as associated with a power screw driver is shown in the patent to A. H. Haberstump, 2,820,494, dated January 21, 1958.

In the transfer of articles from the oscillating hopper to the delivery chute, there is a tendency for articles oriented within the oscillating hopper mechanism to contact and upset articles in the delivery chute. This is especially the case with elongated articles such as screws or rivets having a length of 1⅛ inches under the head. As a result, the articles become damaged to an extent where they cannot be subsequently used. Arresting mechanisms situated in the vicinity of the transfer point have been provided to prevent the transfer of articles to the delivery chute when the latter is full and thereby preventing any injury to the articles. Such mechanisms have not been wholly satisfactory since they do not eliminate the gap between the mechanism for arranging and transporting articles within the oscillating hopper, and the delivery chute. A smooth and continuous interchange of articles at the transfer point is important in not only preventing injury to the articles, but also for assuring that the article transporting mechanism operates quickly and efficiently.

Part of the difficulty in transferring articles from the oscillating hopper to the delivery chute is caused by the mechanism for arranging and transporting articles disposed within the hopper itself. If the articles are not properly positioned or oriented prior to the transfer of the same to the delivery chute, there is a distinct likelihood that articles will be injured in the transfer. Moreover, it is desirable that articles, which have been properly oriented for transfer to the delivery chute, are maintained in this position when the delivery chute is full since this can materially reduce the possibility that the articles will be damaged.

Accordingly, it is an object of the present invention to overcome the disadvantages of heretofore existing article transporting mechanisms of the oscillating hopper variety.

Another object of the present invention is the provision of an improved oscillating hopper apparatus which provides a smooth and continuous transfer of articles to a delivery chute, and which eliminates the tendency of articles to contact one another at an article transfer point.

Still a further object of the present invention is the provision of an oscillating hopper mechanism which properly orients and positions articles for subsequent transportation thereof and transfer to a storage and collecting device, such as an inclined delivery chute.

A still further object of the present invention is the provision of an improved oscillating hopper device which permits only properly positioned articles to be transferred to a storage and collecting device such as a delivery chute or the like.

The smooth and continuous transfer of articles from the oscillating hopper device to the delivery chute is only important so long as the articles are maintained in proper alignment within the chute and released therefrom at a desired interval. In power screw drivers and other similar apparatus, screws must be transferred to the screw driving mechanism at discrete time intervals corresponding with the reciprocatory movement thereof during each machine cycle. If articles are not properly positioned within the delivery chute and released at the proper time, screws will not be driven during each machine cycle with the consequence that there will be an inefficient machine operation.

In overcoming these last mentioned disadvantages, the present invention has, as an additional object, the provision of an improved delivery chute which guides and maintains articles in proper relationship to one another throughout substantially the entire length of the chute.

A still further object of the present invention is the provision of a device which improves the escapement of articles from the delivery chute for accurate and repetitive feeding thereof.

Other objects and advantages will become apparent from the following description when taken in conjunction with the accompanying drawings wherein:

FIG. 1 is a fragmentary elevational view, partly in section, of the article transporting apparatus constructed in accordance with the principles of the present invention as used in conjunction with a power screw driver;

FIG. 2 is a side elevational view, with parts broken away, of a self-contained article transporting apparatus;

FIG. 3 is a fragmentary perspective view of the oscillating hopper mechanism as associated with the collecting and delivery chute;

FIG. 4 is a fragmentary perspective view of the article escapement device of the present invention;

FIG. 5 is a front elevational view, partly in section showing the operation of the article escapement device;

FIG. 6 is an enlarged fragmentary sectional view of the article arranging and transporting mechanism disposed within the oscillating hopper;

FIG. 7 is a view similar to FIG. 6 and showing the article arranging and transporting mechanism at the bottom of the oscillating hopper mechanism downstroke;

FIG. 8 is a view similar to FIGS. 6 and 7, and showing the article arranging and transporting mechanism at the top of the oscillating hopper stroke; and FIG. 9 is an exploded perspective view of the connection between the article arranging and transporting mechanism, and the collecting and delivery device.

Referring now in greater particularity to the drawings, and first to FIG. 1, it will be seen that the article transporting apparatus is generally identified by the numeral 10. This apparatus can be made an integral part of various devices such as power screw drivers, riveting devices and the like, or it can be a self-contained unit for association with these type of devices. In FIG. 1 of the drawings, the article transporting apparatus 10 is illustrated as being integrally associated with various elements of a power screw driver mechanism, whereas in FIG. 2, the article transporting apparatus is shown as comprising a self-contained unit.

To facilitate an understanding of the article transporting apparatus of the present invention, a description will first be given of the component parts thereof with general reference to FIG. 1 of the drawings. An inspection of that figure will reveal that the major component of the article transporting apparatus 10 consists of an oscillating hopper mechanism 20 which is rocked about a pivot axis by the driving mechanism of the power screw driver (not shown). Disposed within the oscillating hopper is an article arranging and feeding mechanism 30 for orienting and transferring articles 50 to the article collecting and delivery chute 80. The positioning and orientation of articles within the hopper is determined by the hopper gate mechanism 70, and those articles which have been properly positioned are transferred to the article collecting and delivery chute 80. The transfer of articles from the article arranging and feeding mechanism 30 to the article collecting and delivery chute 80 is smoothly and efficiently accomplished by the pivotal connection 60 therebetween. Individual release of the articles 50 to an article catcher 120 of the power screw driver is accomplished by the article escapement mechanism 100 which is also operated by the driving mechanism of the power screw driver. Articles can thus be arranged and transported to an article catcher of a power screw driver in timed relation with the reciprocatory movement of the screw driving mechanism. The exact mode of operation of a power screw driver with an article transporting apparatus similar to that of the present invention is shown and described in A. H. Haberstump Patent 2,820,494 referred to above. In the case of the self-contained unit, the components of the article transporting apparatus are generally the same, and differ only in the manner of attachment to and operation by its own power transmitting apparatus as will subsequently appear.

Hopper mechanism 20 shown in FIG. 1 is pivotally secured to the frame 12 of the power screw driver by way of a shaft (not shown) journaled within a pair of brackets 16 which extend from the frame 12 on opposite sides of the hopper mechanism. These brackets are in turn adjustably mounted to ears 14 integrally welded to the frame. The hopper 20 is oscillated by the connecting rod 18 which is, in turn, operated by the drive train of the power screw driver. At the lower end of the connecting rod 18, a connector 19 is provided, and is pivotally connected to the hopper. This permits substantially the same force to be applied to the hopper by the connecting rod 18 throughout its various positions.

Hopper 20 has a bottom 21, a front wall 22, a rear wall 23, and side walls 24 defining a receptacle for receiving articles, such as elongated headed screws 50, in disoriented array. An overhanging ledge 26 extends around the upper edge of the front, rear and side walls to prevent escapement of the articles when the hopper is oscillated. The inner periphery of this overhanging ledge 26 defines the opening of the receptacle. It will be noted that the rear wall 23 of the hopper as best seen in FIG. 3 has, in addition to the overhanging ledge 26, a downwardly extending flange 28 to aid in preventing escapement of the articles at the lowermost position of the hopper.

It is to be understood that while the article transporting apparatus of the present invention is peculiarly adapted for headed articles such as screws and rivets, other articles such as nuts, washers and the like may also be arranged and transported by the apparatus of the present invention.

The initial arrangement and feeding of articles is accomplished by mechanism 30 disposed within the hopper. As best seen in FIGS. 1, 3, and 6–8, this mechanism is shown as comprising a pair of track or rail elements 32 which extend upwardly from the bottom 21 of the hopper, and have a generally upward inclination between the opposed side walls 24. Rail elements 32 are spaced apart by an article supporting bar 36 for a major portion of their length to define a channel 38 for receiving the articles 50. The upper extremity of this article supporting bar has a curvilinear surface which generally extends downwardly from the hopper gate or sensing mechanism 70 toward rear wall 23 of the hopper. It will be observed in FIGS. 6–8 that the upper curvilinear surface of the article supporting bar 36 is provided with downwardly extending curved surfaces 40 and 44 adjacent opposite ends thereof, and a reversely curving surface 42 extending therebetween. The particular construction of this article supporting bar is important as it will aid in feeding the articles 50 in the following manner.

As the hopper oscillates, the articles 50 are constantly thrown against the rear wall 23 and the bottom 21 of the hopper. The result of this is that a number of the articles will be received within the channel 38 on the downstroke of the hopper, and transported toward the hopper gate 70 when the hopper is raised.

The oscillation of the hopper aids in positioning the rail elements 32 and the article supporting bar 36 on both sides of a horizontal plane passing through the hopper pivot point to take advantage of gravitational forces in the orientation and transportation of the articles to the article collecting and delivery chute 80. As has been previously discussed, the hopper pivots on a shaft (not shown) extending between the brackets 16; however, in order to understand the movement of the hopper relative to a horizontal plane passing through this point, it is to be noted that the hopper pivot point is substantially in alignment with the pivotal connection 60.

When the rail elements 32 and the article supporting bar 36 are positioned below the horizontal plane passing through the hopper pivot point which is substantially in alignment with the pivotal connection 60, the articles 50 will freely enter the channel 38 with the aid of gravity as will presently appear. The sloping surfaces 34 which surround the rail elements 32 adjacent rear wall 23 create a trough area for accommodating articles 50 therewithin, and for causing the articles to slide within channel 38. The article supporting bar 36 terminates short of rear wall 23 in the vicinity of the downward slope of the rail elements 32, and this construction defines a recess between the rail elements for receiving the articles in a substantially vertical position. This recess and the surrounding trough area will receive and align articles with the aid of gravity on the downstroke of the hopper as illustrated in FIGS. 6–7 of the drawings. In FIG. 6, the rail elements 32 and article supporting bar 36 are illustrated as the hopper begins its downward movement. It will be noted that several of the articles 50 are partially received within the channel 38, and have their heads facing toward the rear wall of the hopper. FIG. 7 shows the rail elements 32 and the article supporting bar 36 in their lowermost position, and where the rail elements 32 are most receptive to the articles 50 due to the force of gravity and the construction of the hopper in the vicinity of the rear wall 23. It is to be observed that even though the articles 50 have their heads facing the rear wall 23 on the downstroke of the hopper, the lowermost position of the hopper will reverse the direction in which these heads face since the shank of the articles will be received within the recess in a substantially vertical position to realign the head of these articles.

Gravitational forces also aid in the transportation of the articles 50 to the article collecting and delivery chute 80 by reason of the fact that the position of the rail elements and article supporting bar above the horizontal plane will cause articles 50 to slide down channel 38 toward the hopper gate mechanism 70 for subsequent transfer to the article collecting and delivery chute 80. The movement of the articles, when the rail elements and article supporting bar are above the horizontal plane, is shown in FIGS. 1 and 8.

It is important in the transfer of articles 50 from the article arranging and transporting mechanism 30 to the article collecting and delivery chute 80 that the articles be transferred in a smooth and continuous manner. In prior art devices, there is a tendency that an obstruction will be created at the transfer point due to the gap existing between the article arranging and transporting mechanism 30 and the article collecting and delivery chute 80. Furthermore, elongated headed articles tend to contact or upset one another at this transfer point, thus injuring the articles themselves and preventing subsequent use.

To alleviate this problem, the present invention provides a pivot-type hinged joint 60 for mechanisms 30 and 70 to eliminate any gap therebetween. The general construction of this pivot connection is shown in FIGS. 1–3 with a more particular showing of the component parts thereof in FIG. 9. An inspection of FIG. 9 will reveal that the rail elements 32 each have a journal element 62 at one extremity which are spaced apart from one another for receiving the journals 83 formed at one end of the opposed plates 82 of the delivery chute 80. The journals 62 are adapted to receive the needle bearings 64, the latter in turn receiving the connecting screws 66 for pivotally securing the track or rail elements 32 and the opposed plates 82 of the chute 80. It is preferable that the end of the rail elements 32 mate with the outer peripheral surfaces of journals 73 to obviate any possibility that a gap will be created during the oscillation of the hopper. In this manner, smooth and uninterrupted transfer of articles from mechanism 30 to mechanism 70 will be provided, thereby increasing the efficiency of article transfer as well as improving the operation of the oscillating hopper mechanism itself.

To further enhance the transfer of articles in the vicinity of the pivotal connection 60, there is provided a hopper gate mechanism 70 which senses the orientation and alignment of articles transported within the channel 38 to assure the transfer of only properly positioned articles to the delivery chute 80. This mechanism is provided with a guiding element 72 having a concavo-convex shape in cross section which presents a downwardly facing concave surface overlying the rail elements 32 and the opposed plates 82 of the delivery chute 80 to define a passageway therebetween for accepting articles having a substantially horizontal position. An upstanding arm 74 extends transverse to the upper surface of the guiding element 72 and is provided with a pin element 76 adjacent its free end as will be observed in FIGS. 1, 3 and 8. A hopper gate support 78 is secured to a portion of the front wall 22 of the hopper, and is formed with an elongated slot for receiving the pin element 76 of the upstanding arm 74. Thus, the pin element 76 can slide within the elongated slot and permit the guiding element 72 to have a floating mounting with the hopper. Articles fed up the channel 38 of the article arranging and transporting mechanism 30 will be forced to lie within the passageway referred to above or they will not be transferred to the article collecting and delivery chute 80. Since the guiding element 72 has a floating mounting with the hopper, articles accepted beneath the downwardly facing concave surface thereof and into the passageway will be gently held in the critical area between mechanisms 30 and 80. Also, this floating characteristic of the hopper gate 70 will permit different sized articles to be received therein since it is, to a degree, self-adjusting.

The article collecting and delivery chute 80, has a pair of downwardly inclined opposed plates 82 which are spaced apart from one another by a distance less than the radially outwardly extending head of the articles 50, but which is slightly greater than the elongated shank portion thereof to facilitate reception of the articles within the chute. It is important that the articles be maintained substantially normal to the plane of the opposed plates 82 to facilitate subsequent escapement, and for this purpose, a track cover 90 has been provided to establish this desired relationship. The track cover 90 is spaced from the top surface of each of the opposed plates 82 by the track cover holders 92 located adjacent opposite ends of the plates. As will be observed, the track cover element 90 extends for substantially the entire length of the opposed plate 82, and is spaced from the top surfaces thereof by an amount not materially greater than the width of the head of articles 50. It is desirable that a slight air space exists between the top surface of each article head and the bottom surface of the cover element 90 to assure that friction will not impede the progress of the articles, but this space should not be so great that the desired perpendicular relationship between the articles and the opposed plates would be lost.

The opposed plates 82 and the track cover element 90 receive some support from the hopper. It will be noted in FIG. 3 that the U-shaped member 84 which surrounds the opposed plates has each leg thereof secured to one end of Z-shaped supporting straps 86, the latter in turn being pivotally secured to the hopper by the fastener 88. This support is supplementary to the main support which is derived from the power screw driver itself.

The articles may be readily transferred from the delivery chute 80 to shipping cartons or other storage containers, but in most applications, it is desirable that means be provided for selectively releasing articles one at a time to another device. This is especially the case with power screw drivers and riveting machines since it is desirable that a single article be transferred to a catcher mechanism of these machines during each machine cycle. One type of catcher device which may be used, and which is designated by numeral 120 in FIG. 1 of the drawings, has a pair of jaws 122 of mirror image construction, each being provided at their lower ends with inwardly directed retaining fingers 124 to permit transverse shifting of a screw into the catcher jaws from the delivery chute. The driving bit 126 is surounded by the catcher jaws 122, and has a driving tip at the lower end of the driver bit which has a shape complementary to that of the recess formed in the head of the screw or complementary to the outer peripheral configuration thereof. The driving bit 126 is adapted to be vertically positioned relative to an article received within the inwardly directed retaining fingers 124 of the catcher jaws to force or drive the same into an associated workpiece. This driving bit 126 is operated by mechanical or hydraulic means such as shown in A. H. Haberstump Patent 2,820,494 dated January 21, 1958, and since the driving bit is lowered only once during each machine cycle, it is desirable that articles be successively released from the delivery chute in timed relation thereto.

To accomplish removal of articles from the delivery chute at discrete time intervals which is synchronized with the reciprocation of the driving bit 126, an escapement device 100 is provided. It will be noted from an inspection of FIGS. 1–2 and 4–5 that the escapement device 100 comprises first and second article engaging elements designated 102, 104 respectively which are adapted to be received within nonaligned apertures formed below the top surface in the opposed plates 82. These article engaging elements are adjustably mounted on a U-shaped frame or yoke member 108 which is adapted to be oscillated about pivot point 112 by the bell crank lever 110. The bell crank lever 110 is secured at one end to the U-shaped frame member 108, and is pivotally mounted through shaft 112 to the escapement support 114. It is to be observed that the escapement support 114 is provided with a pair of legs 114 which are secured to the plates 82. As best seen in FIG. 5, the mounting of the escapement mechanism to the opposed plates in this manner will permit the cover element 90 to extend between the legs of both the frame member 108 and the escapement support 114 for guiding the articles at this location, as well as throughout the other areas of the opposed plates 82.

Article engaging elements 102, 104 will engage the shank of the elongated articles to feed them in an accurate manner. The head configuration of varied elongated headed articles differ substantially not only in their shape, but also in their size, thus making it relatively difficult to use the head of such articles as a basis for selective article escapement from the delivery chute. Furthermore, the head of such articles will be inclined in substantially the same manner as the opposed plates 82 to pose an additional complicating factor. The positioning of the article engaging elements of the present invention into the passageway between the opposed plates 82, on the other hand, is not made more difficult by the size, shape or inclination of the screws since these members will effectively block any headed article located within the passageway, and when moved out of engagement therewith, will not impede article movement.

The first article engaging element 102 is adapted to engage the lowermost article received within the passageway between the plates when positioned within the passageway. At this time, the second article engaging element 104 is retracted from the passageway, thereby requiring the first article engaging element 102 to restrain the movement of all articles positioned therewithin. When the U-shaped frame member 108 is oscillated by the bell crank lever 110, the position of the article engaging elements will be reversed. Release of the lowermost position article from the delivery chute is thus accomplished upon the retraction of first article engaging element 102, but before this occurs, the second article engaging element will be moved into the passageway below the position of the next lowermost article to act as a blocking means for the remainder of the articles positioned within the chute. As a result, the oscillation of the first and second article engaging elements will facilitate the release of articles one at a time from the delivery chute.

In the case of power screw drivers, this is desirably accomplished at a time when the screw driver bit 126 is approaching or maintained at its top dead center position. An article 50 which is released from the chute by the escapement mechanism 100 will be suitably received between the inwardly directed fingers 124 of the catcher jaws for subsequent operation thereupon by the reciprocating screw driving bit 126. A specific description of the means employed to operate the escapement mechanism 100 in conjunction with a power screw driver is shown and described in A. H. Haberstump Patent 2,820,494 referred to above. To aid in understanding the operation of the escapement mechanism 100 of the present invention in a power screw driver apparatus, a brief description of the parts driving the escapement mechanism bell crank lever will now be described.

The long arm of the bell crank lever 110, as shown in FIG. 4, is bifurcated at its outer end, and a pin pivotally connects the same to a control rod 130. FIG. 1 illustrates that the control rod 130 projects straight up through the eye of the arm 132 associated with a reciprocating catcher control member (not shown). A stop 134 is adjustably secured on the control rod 130 by means of a set screw or the like, and a similar stop 136 is adjustably positioned on the control rod 130 below the arm 132 in a similar manner. Control rod 130 is normally biased upwardly by a spring or the like, and is lowered to operate the escapement mechanism 100 in the following manner. When the power screw driver is in quiescent position, the catcher control member is in a raised position. The driving mechanism of the power screw driver causes the lowering of the catcher control member to force the arm 132 thereof into abutment with the stop 136. Further movement of the arm 130 will force the control rod 130 downwardly, and since the bell crank lever 110 is secured to the control rod 130, it will be oscillated about pivot point 112 to operate the escapement mechanism in the manner previously described.

Where a self-contained article transporting apparatus is desired, the embodiment shown in FIG. 2 may be used. This embodiment is similar to that just described as indicated by the application of identical reference numerals with the suffix "a" employed to identify like parts. As will be apparent, the article transporting apparatus 10a comprises an oscillating hopper 20a having an article arranging and transporting mechanism 30a associated therewith, a pivotal connection 60a securing mechanism 30a to the article collecting and delivery chute 80a, a hopper gate 70a for sensing the proper orientation of articles in the vicinity of the pivotal connection, and an escapement mechanism 100a. The connecting rod 18a oscillates the hopper 20a, but in this instance, the connecting rod is operated by means positioned beneath the article transporting apparatus and enclosed within the frame 130. The bottom wall of the hopper frame 130 has a motor 132 secured thereto. The motor operates a crank 134 having a roller 136 operating in a slot 138 of the lever 140. Lever 140 is secured by a pivot 142 to the hopper frame, and the rod 18a is secured by a pivot 144 to the lever 140. The arrangement of these parts is such as to produce a difference in speed between the raising and lowering of the hopper.

It is to be understood that this particular mechanical linkage per se forms no part of the present invention as it is substantially identical to the structure shown in A. H. Haberstump Patent 2,943,764 dated July 5, 1960. Other types of mechanical linkages, fluid motors and other power transmitting devices may be employed to provide the desired oscillation of the hopper and thereby effect the orientation and transportation of the articles received by the hopper.

The escapement device 100a may be operated either by hand or by a solenoid or pneumatic actuated mechanism to permit the sucessive release of articles from the article collecting and delivery chute 80a. The solenoid and pneumatic actuated devices may be operated in response to impulses received from the control mechanism of an adjacently positioned machine as will be apparent.

From the foregoing, it will now be appreciated that the present invention contemplates a unique article transporting apparatus which not only orients and transports articles to a transfer point, but also will sense the proper orientation of articles at the transfer point and provide a smooth and continuous transfer to a delivery chute for selective escapement therefrom. Articles will thus be efficiently moved along a prescribed path without subjecting them to injury to result in an improved operation of the article transporting apparatus itself.

The specific embodiments of the invention shown and described herein is to be understood as being for illustrative purposes only. Various changes in structure will no doubt occur to those skilled in the art, and are to be understood as forming a part of the invention insofar as they fall within the spirit and scope of the appended claims.

What is claimed is:

1. A transporting mechanism for headed articles comprising a support, a hopper pivotally mounted on said support and having a bottom, front, rear and side walls for receiving said headed articles in disoriented array, means for oscillating said hopper from a raised to a lowered position, and means for orienting and transporting articles to a predetermined location including a pair of rail elements projecting upwardly from the bottom wall of said hopper and being separated by an article supporting bar, said rail elements having an upward slope relative to a horizontal plane, and extending from adjacent the rear wall of said hopper to a predetermined location adjacent said front wall, said article supporting bar spaced downwardly from the outer free extremities of said rail elements to define a channel for receiving said articles, the spacing between the outer free extremities of said rail elements and said article supporting bar increasing from said predetermined location to said end wall and having the greatest separation adjacent said end wall, the downstroke of said hopper moving said rail elements and said article supporting bar below a horizontal plane passing through a hopper pivot point to permit orientation and alignment of headed articles within said channel, said rail elements and article supporting bar adapted to be positioned above the horizontal plane aligned with the hopper pivot point on the upstroke of said hopper for engaging and moving said headed articles within said channel to said predetermined location.

2. A transporting mechanism for elongated articles having a radially outwardly extending head comprising a support, a hopper pivotally mounted on said support having a bottom, rear, front and side walls for receiving said headed articles in disoriented array, means for oscillating said hopper from a raised to a lowered position, and means for orienting and transporting articles to a predetermined location including a pair of rail elements projecting upwardly from the bottom wall of said hopper and being separated from one another by an article supporting bar, said rail elements having a downward slope adjacent the end wall of said hopper and upwardly inclined therefrom for a major portion of their length to said predetermined location, said article supporting bar having a curvilinear surface spaced from the outer free extremities of said rail elements and generally extending downwardly toward said one side wall to define a channel between said rail elements for receiving said headed articles, the curvilinear surface of said article supporting bar lying within the boundary of said rail elements in the vicinity of the upwardly inclined portion thereof and extending outside of the rail element boundaries to a point spaced from said rail elements in the area of the downward slope thereof by an amount greater than the length of said elongated articles, said rail elements separated by a recess generally in the vicinity of their downward slope by a distance greater than the portion of said articles beneath said head, but less than the head of said articles, said rail elements and said article supporting bar adapted to be moved on opposite sides of a horizontal plane passing through the hopper pivot point, whereby to permit the smaller portion of said articles beneath said head to be accepted within said recess and held by their heads in a substantially vertical position on the downstroke of said hopper, the upstroke of said hopper causing said article supporting bar to engage and move said headed articles within said channel to said predetermined location.

3. The transporting mechanism as defined in claim 2 wherein the article supporting bar is provided with downwardly extending curves adjacent said one rear wall and said predetermined location, and a reversely curving surface extending therebetween.

4. A transporting apparatus for headed articles including (a) a support,
(b) a hopper pivotally mounted on said support and including a bottom, front, rear and side walls,
(c) means for oscillating said hopper from a raised to a lowered position,
(d) an article arranging and feeding means disposed within said hopper for orienting articles during the lowering of said hopper and for transporting articles to a first station when the hopper is raised, said article arranging and feeding means including a pair of rail elements projecting upwardly from the bottom wall of said hopper and being separated by an article supporting bar, said rail elements sloping upwardly from adjacent the rear wall of said hopper to said first station, said article supporting bar spaced downwardly from the outer free extremities of said rail elements to define a channel for receiving said articles, the spacing between the outer free extremities of said rail elements and said article supporting bar increasing from said first station toward the rear wall and having the greatest separation adjacent the rear wall, said headed articles adapted to be received within said channel on the downstroke of said hopper for orientation and alignment of said articles therewithin, the upstroke of said hopper causing said article supporting bar to engage and move articles within said channel to said first station,
(e) an article collecting and delivery means associated with said article arranging and feeding means for accepting said articles at said first station and for transporting articles to a second station, and
(f) means pivotally interconnecting said article feeding means and said article collecting and delivery means to provide smooth and continuous transfer of articles at said first station.

References Cited by the Examiner

UNITED STATES PATENTS

| | | |
|---|---|---|
| 415,726 | 11/1889 | Matzeliger _____ 221—177 X |
| 611,214 | 9/1898 | Green _____ 221—177 X |
| 2,820,494 | 1/1958 | Haberstump. |
| 2,943,764 | 7/1960 | Haberstump _____ 221—68 |
| 3,026,000 | 3/1962 | Haberstump _____ 221—167 X |
| 3,106,316 | 10/1963 | Belski _____ 221—167 |

ROBERT B. REEVES, *Primary Examiner.*

KENNETH N. LEIMER, *Examiner.*